US010530803B1

(12) United States Patent
Palle et al.

(10) Patent No.: US 10,530,803 B1
(45) Date of Patent: Jan. 7, 2020

(54) SECURE ONLINE TRANSACTIONS

(71) Applicant: Wells Fargo Bank, N.A., San Francisco, CA (US)

(72) Inventors: Naveen Saichand Palle, Hyderabad (IN); Rameshchandra Bhaskar Ketharaju, Hyderabad (IN); Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 219 days.

(21) Appl. No.: 15/201,727

(22) Filed: Jul. 5, 2016

(51) Int. Cl.
*H04L 29/06* (2006.01)
*H04L 29/08* (2006.01)

(52) U.S. Cl.
CPC ...... *H04L 63/1433* (2013.01); *H04L 63/0838* (2013.01); *H04L 63/0861* (2013.01); *H04L 63/0876* (2013.01); *H04L 63/10* (2013.01); *H04L 63/1466* (2013.01); *H04L 63/18* (2013.01); *H04L 63/205* (2013.01); *H04L 67/02* (2013.01); *H04L 67/42* (2013.01)

(58) Field of Classification Search
CPC .......................... H04L 63/1433; H04L 63/205
See application file for complete search history.

(56) References Cited

U.S. PATENT DOCUMENTS

| 7,181,769 B1* | 2/2007 | Keanini | H04L 63/1416 713/166 |
| 7,712,137 B2* | 5/2010 | Meier | H04L 63/1433 713/152 |
| 8,156,552 B2* | 4/2012 | Alagna | G06F 21/554 713/188 |
| 8,484,713 B1 | 7/2013 | Ravishankar et al. | |
| 8,849,979 B1* | 9/2014 | Qureshi | H04L 12/2856 709/223 |

(Continued)

OTHER PUBLICATIONS

Hurley-Smith, Darren; Wetherall, Jodie; Adekunle, Andrew; "Virtual Closed Networks: A Secure Approach to Autonomous Mobile Ad hoc Networks", The 10th International Conference for Internet Technology and Secured Transactions (ICITST), IEEE, Dec. 14-16, 2015, pp. 391-398.*

(Continued)

*Primary Examiner* — Victor Lesniewski
(74) *Attorney, Agent, or Firm* — Merchant & Gould P.C.

(57) ABSTRACT

A user device and a server conduct a secure online transaction. The user device transmits received user login and credentials to the server, as well as one or more properties of the user device, such as a list of applications stored on the user device. The server transmits one or more restrictions back to the user device, such as which ports to close, which applications to close, and what features of applications and the operating system should be limited during the transaction. After implementing the restrictions, the user device and the server conduct the online transaction. A unique ID may be transmitted throughout the transaction and the unique ID may be a hash. After the transaction, the user device purges transaction data, restores normal operation, and notifies the server. The transaction may be conducted in a second tunnel and the other communication via a first tunnel.

19 Claims, 7 Drawing Sheets

(56) References Cited

U.S. PATENT DOCUMENTS

| | | | | |
|---|---|---|---|---|
| 8,918,865 | B2* | 12/2014 | Freericks | G06F 21/54 726/22 |
| 9,336,385 | B1* | 5/2016 | Spencer | H04L 63/1441 |
| 9,438,618 | B1* | 9/2016 | Sultan | H04L 63/1433 |
| 9,842,204 | B2* | 12/2017 | Bailey | H04L 63/1433 |
| 9,973,501 | B2* | 5/2018 | Touboul | H04L 63/0236 |
| 2007/0143851 | A1* | 6/2007 | Nicodemus | G06F 21/55 726/25 |
| 2007/0234061 | A1* | 10/2007 | Teo | G06F 21/566 713/178 |
| 2009/0235359 | A1* | 9/2009 | Abdulhayoglu | H04L 63/0272 726/25 |
| 2009/0328147 | A1* | 12/2009 | Goel | H04L 63/08 726/3 |
| 2011/0099377 | A1* | 4/2011 | Hoornaert | H04L 9/3234 713/172 |
| 2011/0145932 | A1* | 6/2011 | Nerger | G06F 8/65 726/29 |
| 2013/0276125 | A1* | 10/2013 | Bailey | H04L 63/1433 726/25 |
| 2013/0347094 | A1* | 12/2013 | Bettini | H04L 63/0245 726/11 |
| 2014/0201843 | A1* | 7/2014 | Hibbert | H04L 63/1433 726/25 |
| 2014/0245376 | A1* | 8/2014 | Hibbert | H04L 63/1433 726/1 |
| 2014/0337918 | A1* | 11/2014 | Siddiqi | G06F 21/56 726/3 |
| 2015/0088733 | A1* | 3/2015 | Monastyrsky | G06Q 20/382 705/39 |
| 2016/0350539 | A1* | 12/2016 | Oberheide | G06F 21/577 |
| 2017/0017957 | A1* | 1/2017 | Radu | G06Q 20/3829 |
| 2018/0359264 | A1* | 12/2018 | Sweet | G06F 21/577 |

OTHER PUBLICATIONS

Liu, Alex X.; Chen, Fei; "Privacy Preserving Collaborative Enforcement of Firewall Policies in Virtual Private Networks", Transactions on Parallel and Distributed Systems, IEEE, vol. 22, No. 5, Aug. 26, 2010, pp. 887-895.*

* cited by examiner

SECURE ONLINE TRANSACTIONS

BACKGROUND

Hypertext Transfer Protocol Secure (HTTPS) is a protocol for securing communications via computer networks. HTTPS includes communicating over HTTP within an encrypted connection. HTTPS enables authentication of a website and its server and seeks to protect computer users from "man-in-the-middle" attacks, eavesdropping, and tampering with the communication over the computer network. Generally, communication via HTTPS provides a degree of certainty that the contents of communications between a computer user and a web site has not been accessed or manipulated by a third party.

SUMMARY

Embodiments of the disclosure are directed to a system for improving secure online transactions between a client and a server. In one aspect, an electronic computing device includes a processing unit and a system memory. The system memory includes instructions that, when executed by the processing unit, cause the electronic computing device to receive a user's login and a credential, transmit the user's login and the credential to a server, receive a user confirmation from the server, transmit a plurality of electronic computing device properties to the server, receive one or more restrictions from the server, implement the one or more restrictions on the electronic computing device, conduct a transaction with the server, and, after conducting the transaction, purge transaction data from the electronic computing device and report to the server. The one or more restrictions are based on the plurality of electronic computing device properties. Further, the one or more restrictions include a port to close and an instruction to close any of the plurality of other applications that are currently open on the electronic computing device.

In another aspect, a computer-implemented method includes receiving a user's login and a credential, after validating the user's login and the credential, transmitting a verification to a client, receiving a plurality of client properties, transmitting one or more restrictions to the client, upon receiving a confirmation from the client, conducting a transaction with the client, and receiving a post-transaction confirmation from the client. The one or more restrictions include a port to close, an instruction to close any of a plurality of other applications that are currently open on the client, and a feature in an operating system to limit.

In yet another aspect, a method for securing an online transaction includes at a client device, receiving a user's login and a credential, transmitting the user's login and the credential to a server, receiving a user confirmation from the server, transmitting a plurality of client device properties to the server, receiving one or more restrictions from the server, the one or more restrictions being based on the plurality of client device properties, implementing the one or more restrictions on the client device, after implementing the one or more restrictions, transmitting a confirmation to the server, acquiring a unique identifier, conducting a transaction with the server, wherein each communication to the server during the transaction includes a packet with the unique identifier, and, after conducting the transaction, purging transaction data from the client device and transmitting a report to the server.

The details of one or more embodiments are set forth in the accompanying drawings and the description below. Other features, objects, and advantages of these embodiments will be apparent from the description, drawings, and claims.

DESCRIPTION OF THE DRAWINGS

The following drawing figures, which form a part of this application, are illustrative of described technology and are not meant to limit the scope of the disclosure as claimed in any manner, which scope shall be based on the claims appended hereto.

DETAILED DESCRIPTION

Figure 1:
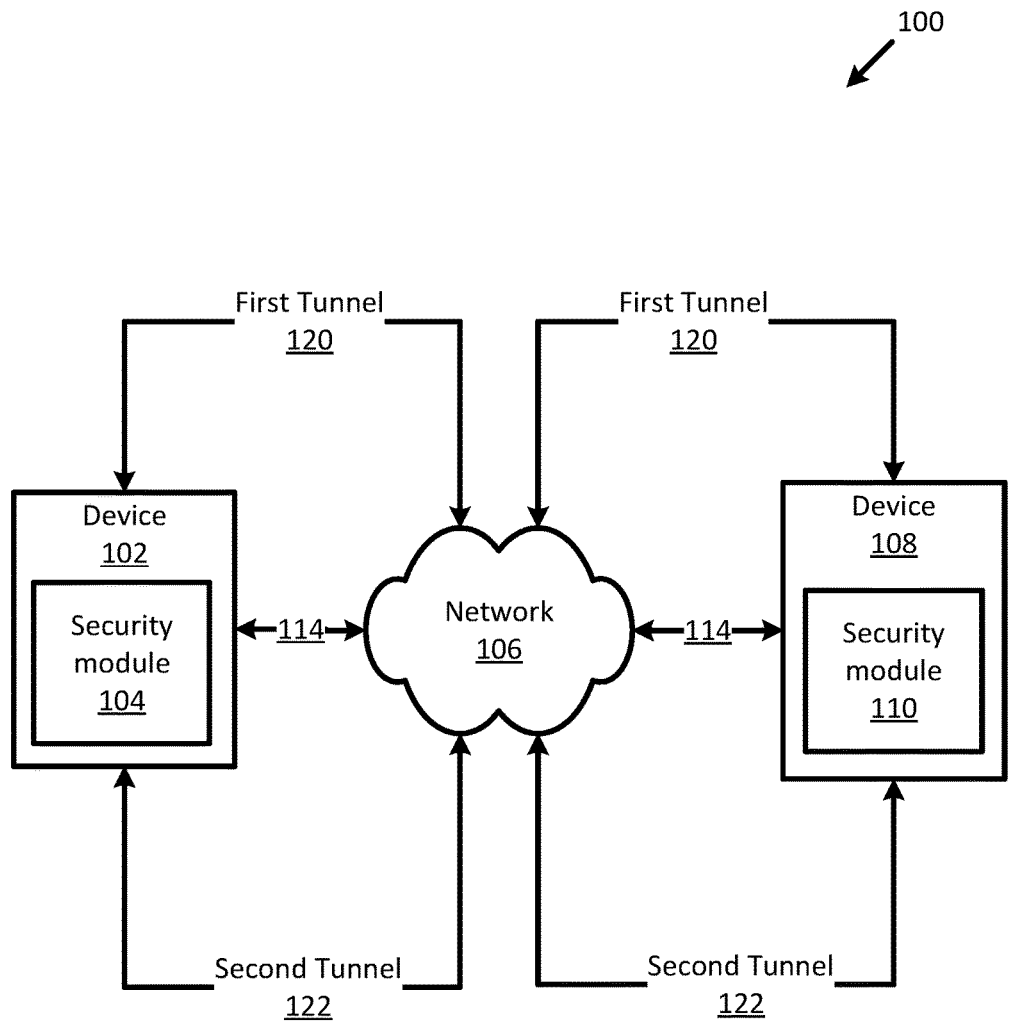
FIG. 1 is a schematic view of an example computing system in which a secure online transaction is conducted.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Broadly, the present disclosure is directed to a system for improving secure online transactions between a client and a server. The system provides additional security beyond the client and server simply using HTTPS for encrypted communication. In some instances, malicious entities can infer sensitive user data from side channels (such as packet sizes), even where a client and device both employ HTTPS protection. Additionally, an enterprise protecting its own server has little to no control over the user's device running a client program. Thus, the user's device can provide an opportunity for security breaches.

In some instances, a device, such as a targeted client or server, may be confronted with application, bandwidth, and/or traffic attacks. In application attacks, the applications that are running in the client and/or server device and their data messages can deplete the resources in the device which makes the transaction system unavailable. Additionally, application attacks may make the transaction system lose connection and vulnerable to threats. Bandwidth attacks result in a loss of network bandwidth and device resources, which may cause denial of service. In traffic attacks, large volumes of transmission control protocol/Internet protocol (TCPIP) pings and/or packets are sent to the client and/or server which can result in a loss of legitimate attacks.

One aspect of the present disclosure improves the security of online transactions by using multiple communication tunnels. In addition, or separately, another aspect of the present disclosure improves the security of online transactions using dynamic IP addresses. In addition, or separately, another aspect of the present disclosure improves the security of online transactions in limiting device access by applications resident on the user's device. Each of these aspects, separately or together, can be employed to enhance the security of the online transaction, including the user's personal data and the transaction details.

FIG. 1 illustrates a schematic diagram of an example security system 100. In the embodiments described herein, the security system 100 provides enhanced security for transactions occurring online. Example online transactions include, transferring money from a bank account, purchasing a good, such as an airline ticket, paying a credit card balance, etc. Generally, the example security system may be desirable for online transactions, especially involving personal data, such as social security numbers, bank accounts, name and address, etc.

The embodiment of the security system 100 shown includes a device 102 with a security module 104 and a device 108 with a security module 110. Typically, device 102 is a client device and device 108 is a server device. Also, security module 104 is typically implemented on device 102 as a client security module, and security module 110 is typically implemented on device 108 as a server security module. Device 102 and device 108 include some or all of the computing components shown and described with reference to FIG. 7. Other embodiments can include more or fewer components.

Device 102 and device 108 communicate via a first tunnel 120 over a network 106. Optionally, device 102 and device 108 may communicate via a second tunnel 122 over network 106. Device 102 may be a general computing device, a tablet computing device, a smartphone, a wearable computing device (such as an augmented reality device), a mobile computing device, or other similar device.

As mentioned, device 102 communicates with device 108 over network 106. Network 106 may be any type of wired or wireless network, for example, the Internet, an intranet, a wide area network (WAN), a local area network (LAN), and a virtual private network.

Security module 104, hosted by device 102, monitors and manages the security of the client side during the transaction. The security module 104 can be a stand-alone application or embedded in an application associated with an entity with which the user is conducting the transaction. For example, the security module 104 can be included as part of an application that is used to communicate with a central server to conduct transactions, as described further below.

The security module 104 manages on-device activity before, during, and after the transaction. Examples of such activity include which applications must be closed during the transaction, which features in open/active applications should be disabled, which ports, if any, should be closed, and which input/output operations should be controlled or closed. An exemplary method 200 implemented by the security module 104 monitoring and managing during a transaction is shown and described in more detail below with reference to FIG. 2.

Security module 110, hosted by device 108, monitors and manages the security during the transaction, typically on the server side. An exemplary method 400 implemented by the security module 110 monitoring and managing during a transaction is shown and described in more detail below with reference to FIG. 6.

In certain embodiments, the entire transaction between the device 102 and device 108 occurs via a communication channel 114 through the network 106 without the use of a tunnel, as shown in FIG. 1. As used herein, "tunnel" refers to a secure communication channel, such as an HTTPS tunnel. In other embodiments, the entire transaction between device 102 and device 108 occurs via the first tunnel 120. In yet further embodiments, part of the transaction occurs via the first tunnel 120 and part of the transaction occurs via the second tunnel 122. The device 108 may initiate communication through the second tunnel during the transaction. For example, if the value of the transaction exceeds a predetermined threshold, then the device 108 and/or the device 102 can dynamically adjust the security used in the transaction.

Figure 2:
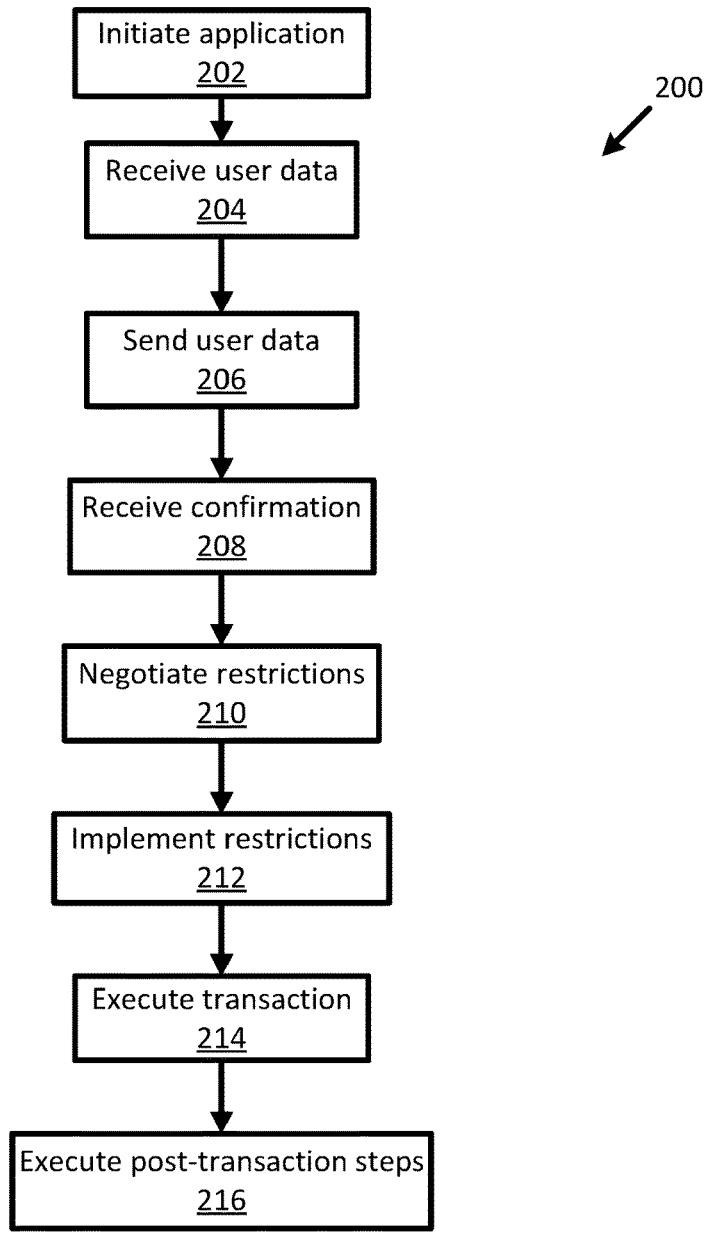
FIG. 2 is an example method of conducting a secure online transaction with a server in the computing system of FIG. 1.

FIG. 2 illustrates an embodiment of an example method 200 for conducting a secure transaction. The example method 200 includes initiating an application (operation 202), receiving user data (operation 204), sending user data (operation 206), receiving confirmation (operation 208), communicating via a first tunnel (operation 210), implementing restrictions (operation 212), executing the transaction (operation 214), and executing post-transaction steps (operation 216). Device 102, the "client device" or "user device," and/or the security module 104 shown in FIG. 1 execute the operations of example method 200. Other embodiments can include more or fewer operations.

The example method begins when a user initiates an application (operation 202). The user device hosts the application, and the application may be developed by, or specific to, the entity with which the user wishes to conduct the transaction. The application (an "app") may be an executable file for a mobile device operating system, such as Apple iOS™, Google Android™, Research in Motion's BlackBerry™ OS, and Microsoft Windows™ Phone OS. A commercially available example is the Wells Fargo Mobile app, available for Apple iOS™ Google Android™, and Microsoft Windows™ Phone OS. In some embodiments, initiating the application also initiates the client security module.

Then the user device prompts for and receives user data (operation 204). Generally, user data include account or login information as well as a credential. Credential includes, for instance, one or more of: a password, a device ID, biometric data, geolocation data, and a one-time passcode. The received user data are sent (operation 206) to the server for authentication.

After the user device receives confirmation (operation 208) from the server that the user is authenticated, the user device and the server negotiate restrictions for the user device (operation 210). In embodiments, negotiating restrictions (operation 210) occurs over the first tunnel.

Figure 3:
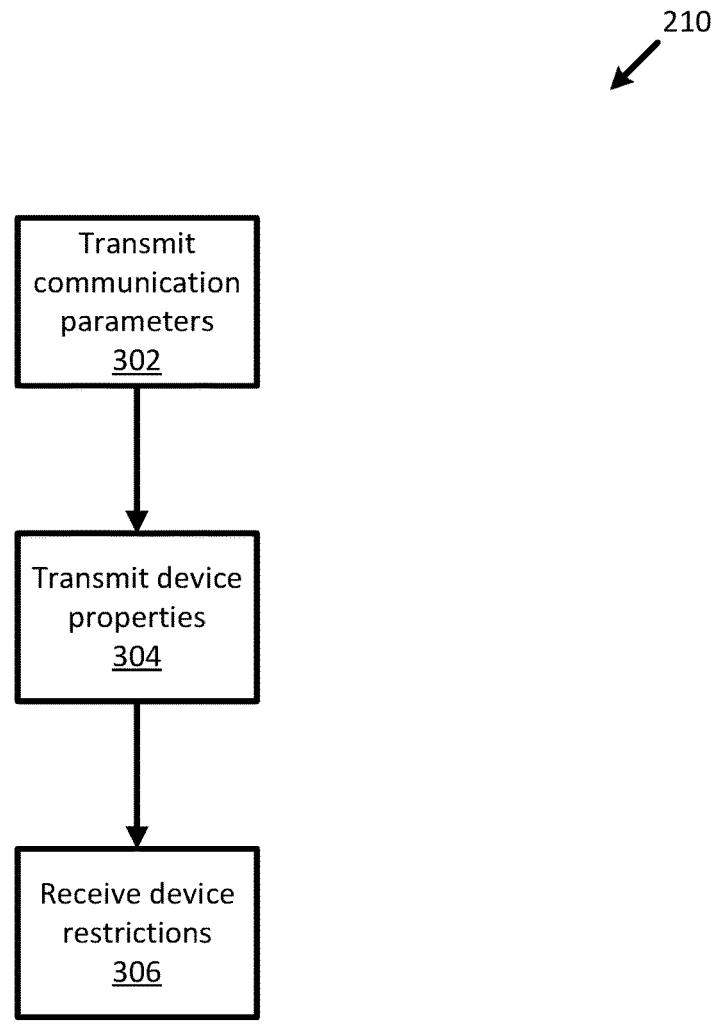
FIG. 3 is an example of the negotiating with a server operation of the example method shown in FIG. 2.

Referring now to FIG. 3, negotiating with the server (operation 210) may include the user device transmitting communication parameters (operation 302) to the server. Communication parameters include, for example, the type of protocol used during the transaction, any security parameters, the purpose of the communication, and how long the communication is expected to exist. Other data are possible.

The user device also transmits device properties (operation 304) to the server. Device properties include, for example, which ports are currently being used, which applications are open on the user device, and which applications are not open but are stored on the user device. Other device properties may include a type of operating system, a type of internet connection, and a browser type. Other data are possible.

Negotiating with the server (operation 210) may also include receiving one or more restrictions (operation 306)

from the server. For example, the user device may receive restrictions about which ports should be closed during the transaction, which applications should be closed, which features to disable in the applications stored on the user device, any user device input/output operations that should be controlled or closed during the transaction, which applications need to run during the transaction, whether the user device requires an additional application, such as a monitoring application, when credentials and other data related to the transaction should be deleted, when operation of the user device can be reset to normal, and whether the communication should be monitored. Additionally, the user device may receive instruction from the server that the transaction will occur via the second tunnel. Other data are possible.

Referring again to FIG. 2, after receiving one or more restrictions from the server, the user device implements the restrictions (operation 212).

Figure 4:
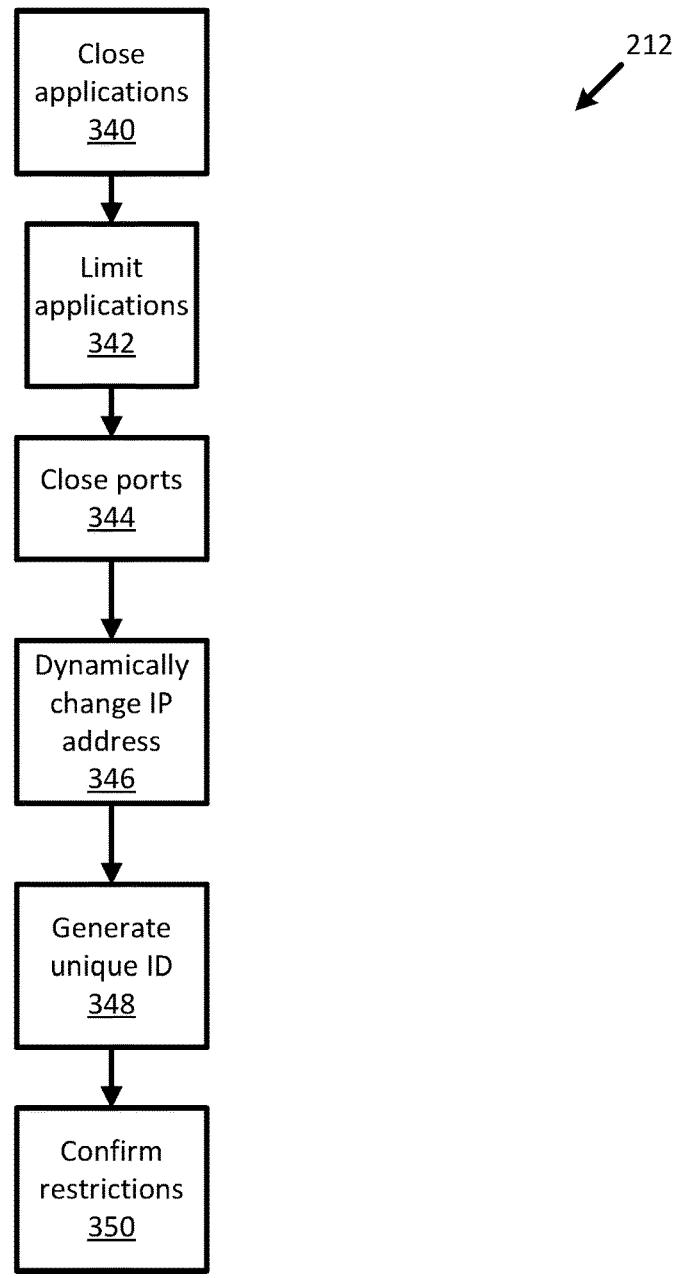
FIG. 4 is an example of the implementing restrictions received from a server operation of the example method shown in FIG. 2.

Referring now to FIG. 4, an embodiment of actions comprising implementing restrictions (operation 212) is shown. Other embodiments may include more or fewer operations and the operations may be performed in a different order than that shown, such as in parallel or based on a decision tree.

Implementing restrictions (operation 212) includes closing all applications (operation 340) as instructed by the server. To accomplish this, the user device may first identify all applications that are currently open or running. Then, the user device would close every application that is running and, if necessary, force the applications to close. Closing applications (operation 340) may also include closing programs that have cross-application functionality, such as Java™, Flash™, Shockwave™, etc.

In embodiments, implementing restrictions (operation 212) includes allowing one or more applications to remain open, but limiting one or more aspects of the application (operation 342). For example, the user device may deny an application access to one or more of: keyboard, internet access, GPS access, Wi-Fi, etc.

Implementing restrictions (operation 212) also includes closing one or more ports (operation 344). For example, the user device may close Port 723 during the transaction. Or the user device may close all ports during the transaction. Other port numbers may be closed.

Implementing restrictions (operation 212) may also include the user device dynamically changing Internet Protocol (IP) address (operation 346). Here, the actual IP address of the server is masked. During negotiation (operation 210), the user device receives a virtual IP address to use for the transaction. Subsequently, the device contacts the received virtual IP address, and the transmission from the user device is re-routed from the virtual IP address to the actual server IP address.

In some embodiments, the virtual IP address may change with each transmission from the user device. During the negotiation in the first tunnel a virtual IP address, client and server associated ports also can be negotiated. If that is the case, then the second tunnel will use that IP address to identify and communicate to the server. A communication can therefore occur via tens or hundreds of IPs and the associated ports. Thereby, any third parties trying to use the virtual IP address after the user device will be rejected.

Implementing restrictions (operation 212) may also include generating a unique ID (operation 348). In embodiments, the user device generates the unique ID. Alternatively, the user device may receive the unique ID from the server.

In embodiments, the unique ID is created based on the negotiation communication, the restrictions received from the server, or both. For instance, the unique ID is a hash (created using, for example, MD5 or SHA-256) of the communications during the negotiation. In other embodiments, the unique ID may be a function of the hash, such as the first 16 characters of the ANSI text value of the hash. In still other embodiments, the unique ID is randomly-generated by the user device or the server and is associated with the negotiation via a database.

Implementing restrictions (operation 212) can also include the user device transmitting a confirmation that all restrictions are implemented (operation 350) to the server. Confirming that the device has implemented the restrictions may initiate the transaction. Additionally, in embodiments using a first tunnel and/or a second tunnel, the confirmation may be transmitted through the first tunnel.

Referring again to FIG. 2, the user device executes the transaction (operation 214) with the server after implementing restrictions (operation 212). As mentioned above, the transaction may be executed in a second tunnel different from the first tunnel that was used during negotiating restrictions (operation 210). Additionally, the user device may include the unique ID in every protocol segment transmitted during execute transaction (operation 214).

During the transaction, the client security module may continuously monitor the closed ports. For example, monitoring the ports may include ensuring that the ports are not opened again prematurely by an application that may be malicious.

After executing the transaction (operation 214), the user device executes post-transaction steps (operation 216). In embodiments, at the end of the transaction, the user device may receive a transmission from the server that the user device operation should be reset back to normal.

Figure 5:
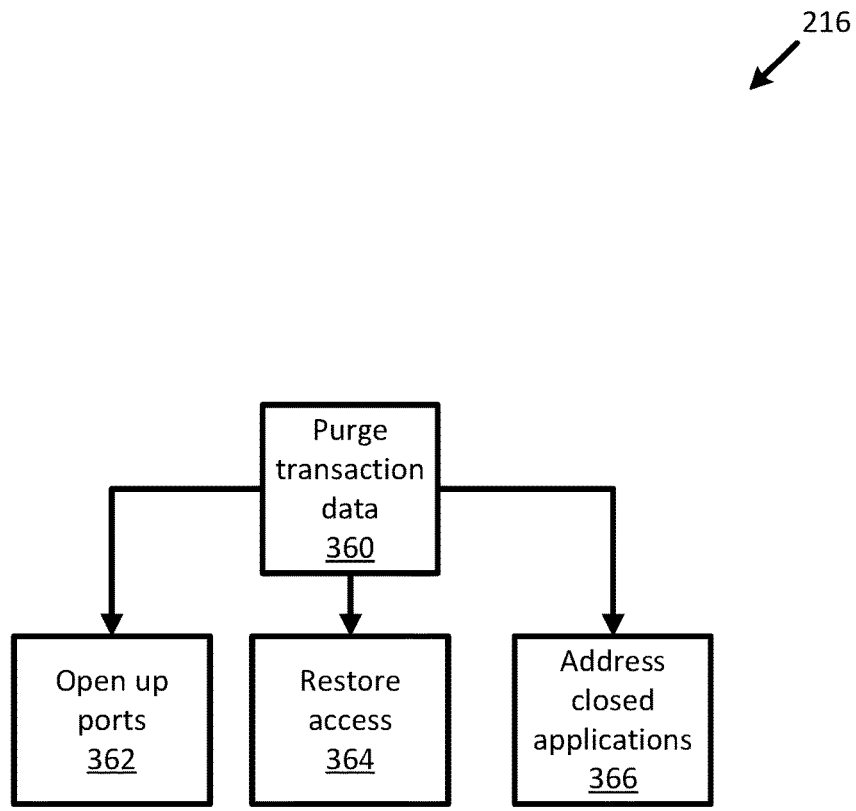
FIG. 5 is an example of the executing post-transaction steps operation of the example method shown in FIG. 2.

Referring now to FIG. 5, post-transaction steps include purging transaction data (operation 360) followed by opening up the device ports (operation 362), restoring access (operation 364), and addressing closed applications (operation 366). In some embodiments, a profile is installed prior to executing the transaction (operation 214) and the profile is responsible for purging transaction data (operation 360). In other embodiments, the client security module purges transaction data (operation 360).

Purging transaction data (operation 360) may include purging credential data, such as a device ID and/or a user ID, and all keylogging information. In other examples, all information associated with the transaction are purged. The user device may also record the types of data purged for later reporting to the server.

After purging data from the user device (operation 360), any ports closed during the transaction are reopened (operation 362). Also, after purging data from the user device (operation 360), access is restored (operation 364). Restoring access includes undoing limitations placed on applications running during the transaction and undoing limitations placed on access to input/output operations.

Any closed applications are addressed (operation 366) after purging data from the user device (operation 360). In embodiments, any application closed before executing the transaction (operation 214) is automatically re-opened. In other embodiments, the user is prompted whether one or more of the closed applications should be re-opened. In still other embodiments, the example method 200 does not address the closed applications; all closed applications simply remain closed.

Figure 6:
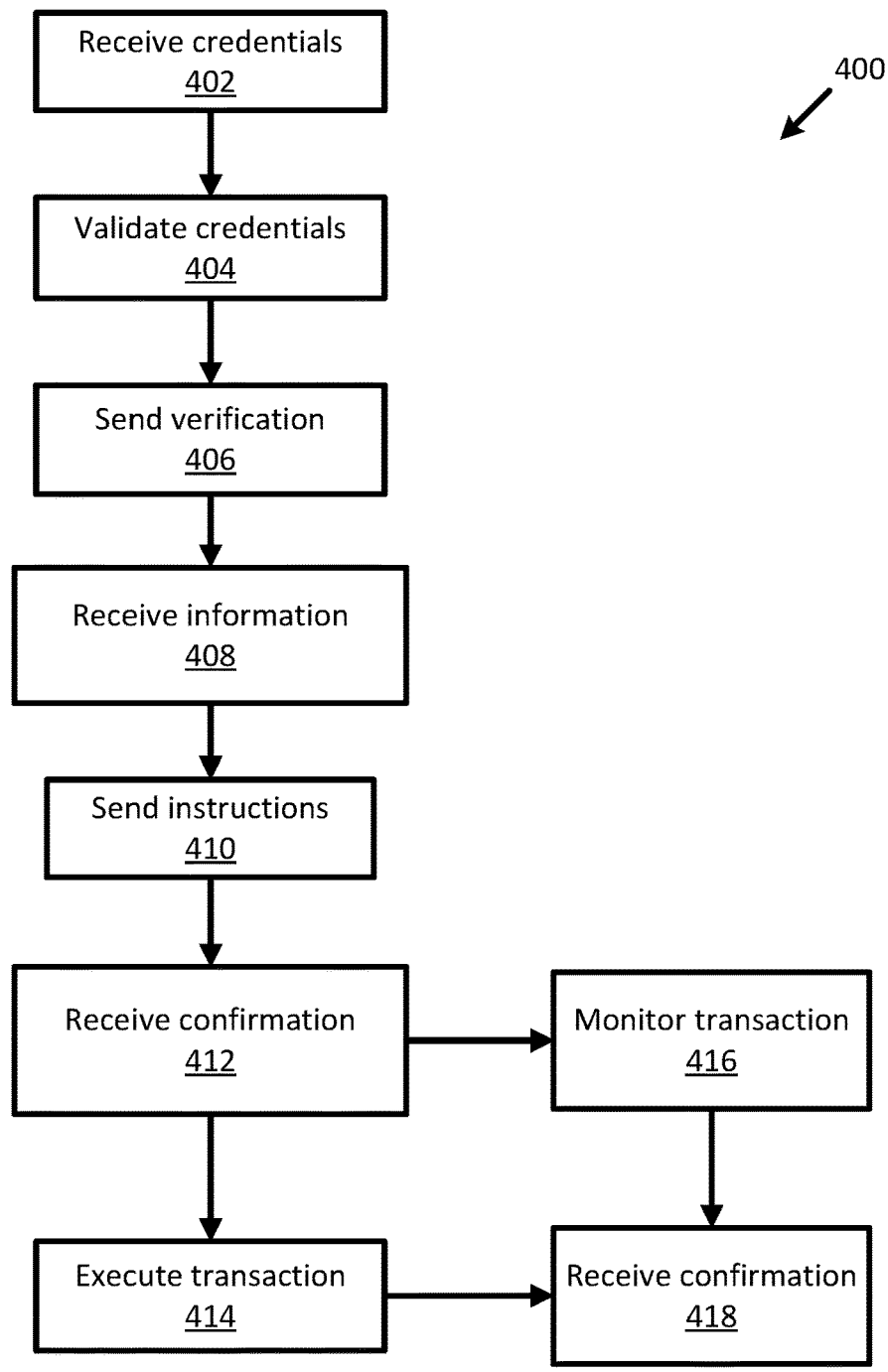
FIG. 6 is an example method for conducting a secure online transaction with a client device of the computing system of FIG. 1.

FIG. 6 illustrates an embodiment of an example method 400 for conducting a secure transaction. The example method 400 includes receiving credentials (operation 402), validating credentials (operation 404), sending a verification (operation 406), requesting information (operation 408), sending instructions (operation 410), receiving confirmation (operation 412), executing a transaction (operation 414), monitoring the transaction in the first tunnel (operation 416), and receiving confirmation (operation 416). The server and/or the server security module shown in FIG. 1 execute the operations of example method 400. Other embodiments can include more or fewer operations.

The example method 400 begins by initiating the server security module. Initiating the server security module may be triggered by receiving credentials (operation 402) from the user device along with user-identifying data, such as a user ID or account number. As mentioned above, credentials may include a password, a device ID, biometric data, geolocation data, and a one-time passcode.

The received credentials are then validated (operation 404). In embodiments, the server hosing the server security module validates that the received credentials match those in a database. The server may also send some or all of the credentials to another entity or server for validation/authentication.

If the credentials are validated, then a verification is sent (operation 406) to the user device. The verification indicates that the user login is approved. The verification may also include a request for all applications on the user device, all active applications on the user device, instructions about communicating via a first tunnel and conducting the transaction in a second tunnel, etc.

In embodiments, the user device responds to the verification by transmitting information that is received at the server (operation 408). This information can include the transaction or type of transaction the user wishes to conduct. The information also includes responses to the queries in the previous transmission (operation 406) regarding user device properties.

Based on the received information, the server transmits instructions (operation 410) back to the user device. The instructions may include limitations to impose on the user device, such as which applications to close, which applications to limit and what aspects of those applications to limit, which input/output access to limit, which ports to close, and any features of the operating system (device or browser) to disable. The instructions may also include post-transaction actions that the user device should perform, such as purging all data, opening ports, restoring applications, etc.

Upon receiving confirmation (operation 412) from the client security module that all limitations have been implemented, the server proceeds to execute the transaction (operation 414). If one or more of the limitations sent to the user device are not implemented, then the server can decide to suspend the transaction.

In embodiments, executing the transaction occurs in the second tunnel. In those embodiments, the server also supervises the transaction via the first tunnel (operation 416) after receiving confirmation (operation 412) in the first tunnel. The server may request verification from the user device in the first tunnel regarding transmissions the user device sent in the second tunnel Additionally, if, via the first tunnel, the server detects a change in the user device status during the transaction, then the server may do any of the following: terminate the transaction occurring in the second tunnel, request the client to re-authenticate, or send a new virtual IP and port. Such a response may be triggered when the server detects anomalies or a violation of one or more of the negotiated limitations. Examples include a third party sniffing the data, if the server detects someone hacked into the network (not necessarily this particular communication), if the server started seeing a slowdown in the second tunnel, if some of the closed applications or ports become reopened, and if another application in the client device started using disabled features.

Upon completion of the transaction, the server closes the second tunnel and receives confirmation (operation 418) from the client security module. This confirmation may include communication that the limitations have been executed, any data regarding the security of the user device during the transaction (such as one of the closed ports being opened), what data were purged, and a log of what actions were taken post-transaction. Upon receiving the confirmation (operation 418) via the first tunnel, the server closes the first tunnel.

Figure 7:
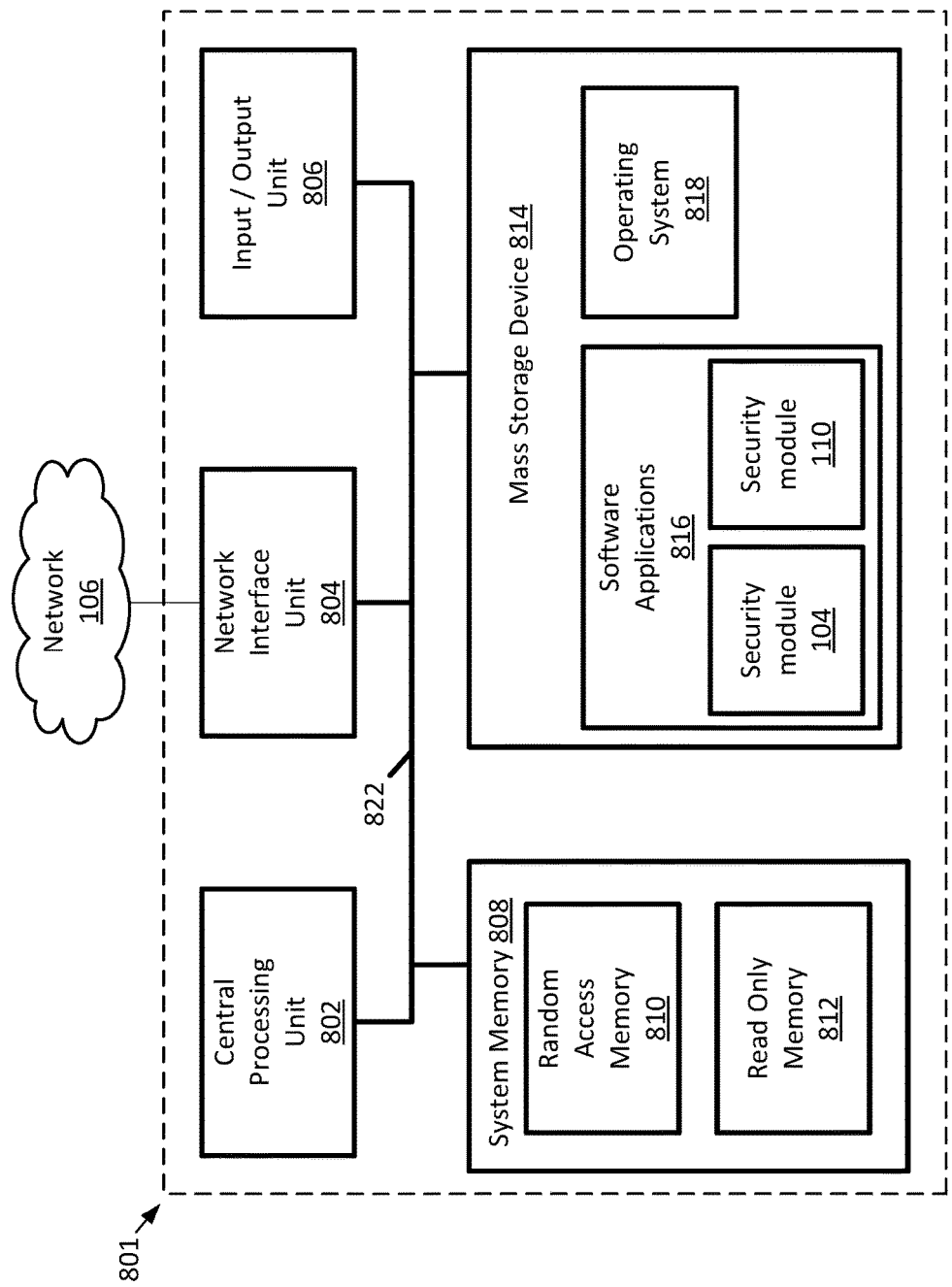
FIG. 7 shows example physical components of a computing device hosting the client security module and server security module of the computing system of FIG. 1.

FIG. 7 shows an example computing device 801 hosting the client security application 104 and/or the server security application 110. As illustrated, the example computing device 801 includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the example computing device 801, such as during startup, is stored in the ROM 812. The example computing device 801 further includes a mass storage device 814. The mass storage device 814 is able to store software instructions and data.

The mass storage device 814 is connected to the CPU 802 through a mass storage controller (not shown) connected to the system bus 822. The mass storage device 814 and its associated computer-readable data storage media provide non-volatile, non-transitory storage for the example computing device 801. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the example computing device 801.

According to various embodiments of the invention, the example computing device 801 may operate in a networked environment using logical connections to remote network devices through the network 106, such as a wireless network, the Internet, or another type of network. The example computing device 801 may connect to the network 106 through a network interface unit 804 connected to the system bus 822. The network 106 may be a protected network, as discussed above. It should be appreciated that the network interface unit 804 may also be utilized to connect to other types of networks and remote computing systems. The example computing device 801 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the example computing device 801 can store software instructions and data. The software instructions include an operating system 818 suitable for controlling the operation of the example computing device 801. The mass storage device 814 and/or the RAM 810 also store software applications 816, that when executed by the CPU 802, cause the example computing device 801 to provide the functionality of the example computing device 801 discussed in this document. For example, the mass storage device 814 and/or the RAM 810 can store software instructions that, when executed by the CPU 802, cause the example computing device 801 to display received data on the display screen of the example computing device 801.

Although various embodiments are described herein, those of ordinary skill in the art will understand that many modifications may be made thereto within the scope of the present disclosure. Accordingly, it is not intended that the scope of the disclosure in any way be limited by the examples provided.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. An electronic computing device, wherein the electronic computing device is a client device, comprising:
  a processing unit; and
  a system memory, the system memory including instructions that, when executed by the processing unit, cause the electronic computing device to:
    communicate with a server through a first tunnel to:
      receive user data including a login and a credential;
      transmit the user data to the server to authenticate with the server;
      receive a user confirmation of authentication from the server;
      transmit a plurality of electronic computing device properties to the server, wherein the plurality of electronic computing device properties comprises:
        a first port that is being used; and
        a plurality of other applications that are currently open comprising a first application;
      based on the plurality of electronic computing device properties, receive two or more restrictions from the server to modify the plurality of electronic computing device properties,
      wherein the two or more restrictions include:
        the first port to close; and
        an instruction to close the first application of the plurality of other applications so that the first application is no longer running on the electronic computing device;
    implement the two or more restrictions on the electronic computing device;
    after implementing the two or more restrictions:
      receive a virtual IP address and port to establish a second tunnel; and
      establish the second tunnel;
    communicate with the server through the second tunnel to:
      conduct a transaction with the server;
      wherein, while conducting the transaction, based on a change to the plurality of electronic computing device properties that violates one or more of the implemented two or more restrictions:
        receive a termination of the transaction occurring through the second tunnel;
        re-authenticate with the server; and
        receive a new virtual IP address and port to complete the transaction through a third tunnel;
    after conducting the transaction:
      purge transaction data from the electronic computing device; and
      report to the server.

2. The electronic computing device of claim 1, wherein the system memory further includes instructions that, when executed by the processing unit, cause the electronic computing device to:
  acquire a unique identifier, wherein each communication to the server includes a packet with the unique identifier; and
  after implementing the two or more restrictions, transmit a confirmation to the server.

3. The electronic computing device of claim 2, wherein the system memory includes a transaction application and a plurality of other applications, the transaction application being used to conduct the transaction with the server.

4. The electronic computing device of claim 3, wherein the system memory further includes instructions that, when executed by the processing unit, cause the electronic computing device to:
  reopen any closed ports, wherein reopening any closed ports occurs after purging transaction data from the electronic computing device; and
  wherein the unique identifier is a hash based on at least some of the restrictions from the server.

5. The electronic computing device of claim 4, wherein the transaction includes a plurality of transmissions to the server; and
  wherein each transmission to the server over the second tunnel includes a virtual IP address associated with the server, and the virtual IP address changes for each transmission.

6. The electronic computing device of claim 3, wherein the two or more restrictions from the server further include:
- a feature in one of the plurality of other applications to disable;
- an input/output feature in an operating system of the electronic computing device to disable; and
- a communication about conducting the transaction in a second tunnel.

7. The electronic computing device of claim 1, wherein the two or more restrictions from the server are received via the first tunnel, wherein the transaction with the server is conducted via the second tunnel, and wherein the system memory further including instructions that, when executed by the processing unit, cause the electronic computing device to:
- while the transaction is being conducted over the second tunnel, sending a confirmation, associated with a transmission in the second tunnel, to the server through the first tunnel.

8. The electronic computing device of claim 1, wherein the transaction data includes at least one of: device ID, user ID, and keylogging data.

9. The electronic computing device of claim 1, wherein the plurality of electronic computing device properties include at least one of: a list of applications in the system memory, a list of open applications in the system memory, and an operating system type.

10. A method for securing a transaction, comprising:
establishing a first tunnel;
through the first tunnel:
- receiving, by a server, a user's login and a credential;
- authenticating the user with the user's login and the credential;
- after authenticating the user's login and the credential, transmitting, by the server, a verification of the authentication to a client;
- receiving, by the server, a plurality of client properties, wherein the plurality of client properties comprises:
  - a first port that is being used;
  - a plurality of other applications that are currently open comprising a first application; and
  - a first feature in an operating system;
- transmitting, by the server, based on the plurality of client properties, two or more restrictions to the client, wherein the two or more restrictions comprise:
  - the first port to close;
  - an instruction to force close the first application that is currently open on the client; and
  - the first feature in the operating system to limit;
upon receiving a confirmation of implementing the two or more restrictions from the client:
- sending a virtual IP address and port to establish a second tunnel; and
- establishing the second tunnel;
through the second tunnel:
- conducting, by the server, the transaction with the client; and
- wherein, while conducting the transaction, based on a change to the plurality of client properties that violates one or more of the implemented two or more restrictions:
  - sending a termination of the transaction occurring through the second tunnel;
  - re-authenticating the client; and
  - sending a new virtual IP address and port to complete the transaction through a third tunnel;

after conducting the transaction, receiving, by the server, a post-transaction confirmation from the client.

11. The method of claim 10, further comprising:
monitoring the transaction in the second tunnel; and
wherein the post-transaction confirmation is received via the first tunnel.

12. The method of claim 10, further comprising:
acquiring a unique identifier, wherein each communication to the client, sent through the second tunnel, includes a packet with the unique identifier.

13. The method of claim 12, wherein the unique identifier is a hash based on at least some of the restrictions,
wherein the transaction includes a plurality of transmissions to the client; and
wherein the unique identifier is different for each transmission during the transaction.

14. The method of claim 13, wherein the post-transaction confirmation includes a plurality of client actions, including:
- purging at least one of: device ID, user ID, and keylogging data; and
- wherein the credential is at least one of: a password, a device ID, biometric data, geolocation data, and a one-time passcode.

15. A method for securing a transaction, comprising:
at a client device, establishing a first tunnel to a server;
through the first tunnel:
- receiving a user's login and a credential;
- transmitting the user's login and the credential to the server to authenticate with the server;
- receiving a user confirmation of authentication from the server;
- transmitting a plurality of client device properties to the server, wherein the plurality of client device properties comprises:
  - a plurality of other applications that are currently open comprising a first application; and
  - a first port that is open;
- based on the plurality of client device properties, receiving two or more restrictions from the server to modify the plurality of client device properties;
implementing the two or more restrictions on the client device, with the restrictions including force closing the first application running on the client device and closing the first port on the client device;
after implementing the two or more restrictions:
- receiving a virtual IP address and port to establish a second tunnel;
- establishing the second tunnel;
- transmitting a confirmation to the server;
- acquiring a unique identifier;
- conducting a transaction with the server, through the second tunnel, wherein each communication to the server during the transaction includes a packet with the unique identifier, and
- wherein, while conducting the transaction, based on a change to the plurality of client device properties that violates one or more of the implemented two or more restrictions:
  - receiving a termination of the transaction occurring through the second tunnel;
  - re-authenticating with the server; and
  - receiving a new virtual IP address and port to complete the transaction through a third tunnel;
after conducting the transaction:
- purging transaction data from the client device; and transmitting a report to the server through the first tunnel.

16. The method of claim 15, further comprising:
reopening any closed ports, wherein reopening any closed ports occurs after purging transaction data from the client device;
wherein the unique identifier is a hash based on at least some of the restrictions from the server; and
wherein the two or more restrictions include:
a port to close; and
an instruction to close any of a plurality of other applications that are currently open on the client device.

17. The method of claim 16, wherein the transaction includes a plurality of transmissions to the server;
wherein a unique virtual IP address is generated for each transmission during the transaction; and
wherein the two or more restrictions from the server further include:
a feature in one of the plurality of other applications to disable;
an input/output feature in an operating system of the client device to disable;
a communication about conducting the transaction in a second tunnel.

18. The method of claim 17,
wherein reporting to the server is via the first tunnel; and
wherein the transaction data includes at least one of: device ID, user ID, and keylogging data.

19. The method of claim 18, wherein the plurality of client device properties include at least one of: a list of applications in a system memory of the client device, a list of open applications in the system memory, and an operating system type; and
wherein the credential is at least one of: a password, a device ID, biometric data, geolocation data, and a one-time passcode.

* * * * *